(12) United States Patent
Nagel et al.

(10) Patent No.: US 9,164,190 B1
(45) Date of Patent: Oct. 20, 2015

(54) PANEL SYSTEM AND METHOD WITH EMBEDDED ELECTRONICS

(71) Applicant: Globaltrak Acquisition, LLC, Rochelle Park, NJ (US)

(72) Inventors: David J. Nagel, Falls Church, VA (US); Justin C. Whiton, Falls Church, VA (US)

(73) Assignee: GlobalTrak, LLC, Sterling, VA (US)

( * ) Notice: Subject to any disclaimer, the term of this patent is extended or adjusted under 35 U.S.C. 154(b) by 0 days.

(21) Appl. No.: 14/452,632

(22) Filed: Aug. 6, 2014

Related U.S. Application Data

(60) Division of application No. 13/305,712, filed on Nov. 28, 2011, now Pat. No. 8,823,514, which is a continuation of application No. 12/017,588, filed on Jan. 22, 2008, now Pat. No. 8,138,913.

(60) Provisional application No. 60/881,170, filed on Jan. 19, 2007.

(51) Int. Cl.
*G08B 1/08* (2006.01)
*G01V 9/00* (2006.01)
*H04W 4/02* (2009.01)

(52) U.S. Cl.
CPC .. *G01V 9/00* (2013.01); *H04W 4/02* (2013.01)

(58) Field of Classification Search
CPC .................................. G01V 9/00; H04W 4/02
USPC ........................................... 340/539.13, 693.5
See application file for complete search history.

(56) References Cited

U.S. PATENT DOCUMENTS 8,823,514 B1 * 9/2014 Nagel et al. .............. 340/539.13

* cited by examiner

*Primary Examiner* — Daryl Pope

(57) ABSTRACT

A system and method for a panel system containing embedded electronic elements providing both housing for the electronics and structural support. A preferred embodiment of the system is for a container security system, which is constructed into or conforming onto the roof, walls, door, or base of a cargo container is provided. The panel system may consist of a variety of electronic elements, batteries or power elements, sensors, a processing element to collect the sensor data, and a communications element to transmit outside of the container.

11 Claims, 6 Drawing Sheets

PANEL SYSTEM AND METHOD WITH EMBEDDED ELECTRONICS

CLAIM OF PRIORITY

The present application is a Divisional under 37 CFR 1.53 (b) of U.S. patent application Ser. No. 13/305,712. Accordingly, the present invention claims priority to U.S. patent application Ser. No. 13/305,712 filed Nov. 28, 2011, which is a Continuation of U.S. patent application Ser. No. 12/017,588 filed Jan. 22, 2008, now U.S. Pat. No. 8,138,913, which was originally filed as U.S. Provisional Application No. 60/881,170 filed Jan. 19, 2007. No new matter has been added.

BACKGROUND OF THE INVENTION

1. Field of the Invention

Embodiments of the present invention relate to embedded electronics in walls or panels. A preferred embodiment of present invention relates generally to container security and, more particularly, to a shipping container security system, and to the sub systems used in this system.

2. Background of the Invention

Currently, most electronic devices are provided with a specific housing, which may be small (such as cell phones or alarm clocks) or large (such as televisions or desk top computers). In some instances, electronics in their housings are attached to wall surfaces, with clocks being an example. That is, current electronics that are fixed to structures having separate housings for their protection and mounting.

As another example, steel containers, such as intermodal shipping containers, which have been in existence for more than fifty years, offer no mechanism for penetrating the container walls electronically with either conducting wires or radiofrequency waves. Thus, inherent difficulty exists in externally inspecting the contents of the container without physically opening the doors, or penetrating by cutting or some other physical means.

A problem faced by the Government and industry is one of providing an intermodal shipping container capable of detecting various modes of threat, such as insertion of unauthorized materials, tampering, exposure to harmful substances such as chemical or biological threats, as well as tracking and reporting on location and contents. This is the "smart" container versus the often called "dumb box" that has been employed by the industry for more than forty years.

A number of Federal government programs have been initiated in the last 2-3 years with the goal of developing either a "smart" container or some key portion of a container security system. The goals have included such features as total system security, detection of inserted weapons of mass destruction (WMDs), detection and reporting of tampering, and maintaining fulltime reporting capability to show location. None has dealt so specifically with chemical and biological protection or the use of innovative materials for the container ("hybrid polymer" is the RFP terminology).

Accordingly, a solution is needed for embedding electronics in walls or panels for various purposes including the transmission of information or data through those walls are panels.

3. Description of the Related Art

A container security system as described by System Planning Corporation (SPC) (U.S. Pat. No. 7,098,784) herein referred to as "the SPC Invention", performs many of the functions to monitor containers, their content, and to detect tampering within a container during transit. This is accomplished through a device is which attached to a container, which performs multiple functions. Some of these functions may include controlling various sensors, collected the data from these sensors and transmitting this data back to a central monitoring station. The central monitoring stations may also send commands and information to individual containers equipment with this device.

The SPC invention is has all of the electronic elements a in a housing. To install the SPC device on the container it must be mounted or attached which is often a cumbersome operation. In order to facilitate installation on a container, different mounting brackets may be used but these result in additional cost. Also, for the SPC invention, the antenna device to the communication subsystem and the global positioning element is mounted on the exterior of the container. In this case it can be easily damaged, limits the ability to effectively stack containers, and it obvious to any person.

BRIEF SUMMARY OF THE INVENTION

Embodiments of the present invention offer a solution which can provide an alternative housing. In aspects of the invention, parts of structures can serve as both the protection and support for electronics. That is, embodiments of the invention have the advantage of integrating the functions of electronics and of structures to the improvement of both.

One preferred embodiment of the invention involves panels, which mayor may not provide mechanical functions, into which electronics have been embedded wholly or partially for any purpose.

The system in the present invention is integrated or built into the container structure. It may be installed in the factory, or variations thereof permanently retrofitted in the field. It is highly concealed, and does not limit the stacking or other common movement of containers during the shipping process. It is lower in cost, more durable, and by integrating the sensors will allow superior performance in the detection of intrusions.

The preferred embodiments of this invention provides a panel system which is integrated into the container walls. This panel may include a variety of electronic elements, batteries or power elements, sensors, a processing element to collect and interpret the sensor data, and communications devices which may include: a short range wireless or a wireless local area connection (WLAN) communications device; a cellular communications device, and a satellite communications device. The system also may contain a global positioning device.

Containers offer few means to penetrate the walls electronically with either conducting wires or radio-frequency waves. As a result there is inherent difficulty in externally inspecting the contents of the container without physically opening the doors, or penetrating by cutting or some other physical means. A panel system with embedded electronics will allow immediate and noninvasive inspection and internal communication by a number of means, which include optical, radio-frequency or other modalities of either inspection or communication.

In the present invention, the panel system is integrated into the roof, base, walls, or door area of the container and become part of the structural elements of the container itself. There are several methods for construction of the antenna comprising;

The panel system being built directly into the container roof, base, walls, or door area as a permanently affixed device at the time of container manufacture;

A portion of the container walls, roof, or door being removed, and the panel system being permanently installed replacing the removed section in on the container at the time of container original manufacture, refurbishment, or during field installation;

The accompanying drawings, which are incorporated in and constitute a part of this specification, illustrate various embodiments of the invention and, together with the description, serve to explain the principles of the invention.

BRIEF DESCRIPTION OF THE DRAWINGS

The present invention is described in detail below with reference to the attached drawings figures, wherein.

DETAILED DESCRIPTION OF PREFERRED EMBODIMENTS

Figure 1:
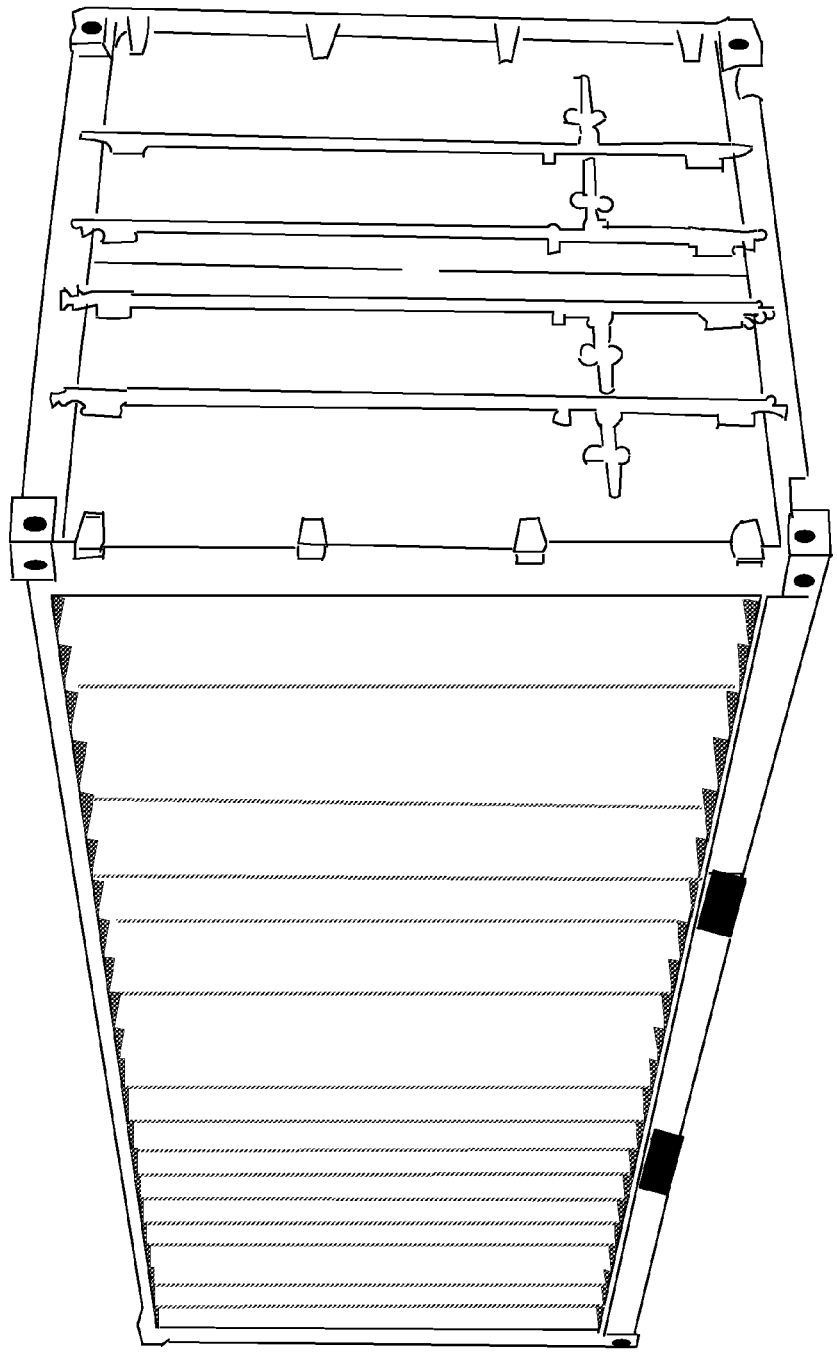
FIG. 1 is a perspective view of a panel in accordance with an embodiment of the invention.

Embodiments of the present invention are directed to a system and method for embedding diverse available electronic components and functions within panels. The panels may be made of non-conducting materials, but electrically conducting panels are possible in some applications. One purpose of the invention is to provide all the functions of modern electronics inside of and near such panels.

Systems incorporating aspects of this invention have diverse functions and numerous uses, including most broadly, the generation, manipulation, storage, communication and usage of information. Such functions may be accomplished by sensing, computing and actuation of materials and energy within the panels or in the locale of the panels. The functions can be used for monitoring environments and people outdoors and indoors for the purposes of safety, for medical reasons, and for physical, information, homeland and national security, among many others.

The panels that contain the electronics can serve many other functions in addition to those provided by the electronics. Such functions include (a) structural support, (b) barriers to matter, energy and biological entities on all scales, including the exclusion or inclusion of humans in nearby spaces, (c) sound and impact absorbers, (d) windows for electromagnetic radiation, notably visible light and radio frequency waves, and (e) decorations, among others.

The panels in embodiments of this invention can have widely varying properties. They might have dielectric properties such that they will transmit any form of radiant energy, especially radiation in the visible and radio-frequency (including microwave) regions of the electromagnetic spectrum. In addition or in distinction to such responses to electromagnetic radiation, the panels might also vary in response to mechanical stresses and, especially, transmit acoustic energy of any frequency. The panels might be transmissive to some of these forms of energy but opaque to others. These and other properties of the panels will depend on the specific applications. For example, transparent materials will be used for applications involving transmission of visible (and nearby infrared or ultraviolet) radiation.

The panels can be made of any materials, natural or artificial. Woods, leathers and other materials from nature of any type can be used. Man-made materials including, but not limited to, all plastics (polymers), glasses, ceramics, papers and fabrics may be incorporated. Panels that operate by using energy in the acoustic spectrum can be made of any of the above materials or metals or alloys. The panels can be made of one or more materials, that is, embodiments of the invention include composites of all types in addition to a single type of material. The composites might be homogeneous in nature or laminates of any type. These and other characteristics of the panels will depend on the specific application. Plastics are expected to be major materials used for the panels for most functions.

The panels can have any geometry. If the panels have six sides, any of the pairs of facing sides can have any geometry and separation (distance apart). Facing sides will commonly be flat and parallel, but that is not a restriction. Parallelism of flat sides is not a requirement. Any of the sides can be curved in any manner. In general, the panels can be any three-dimensional shape of any size. Most of the applications will employ panels that are rectangular solids, where two of the facing sides are at a separation considerably smaller than the other two pairs of facing sides. The shape of the two larger sides will commonly be square or rectangular, but it can also be circular, oval or other shapes.

The electronics embedded in the panels can be of any material and type. Conductors, semiconductors, resistors, glasses, polymers, liquid crystals or all other electronic materials are included in the invention. The electronics can range from individual components to partial or complete functional systems of any type and shape. The embedded electronics can include either or both active and passive components, and they can be any combination of analog or digital devices. The components can be solely electronics, or they can include micromechanical or micro-optical functionality. They can be bare or packaged in any manner. Included in the embedded electronics may be (a) sensors of any type for any physical, chemical or biological entity, (b) computing devices of any type, notably microcontrollers, microprocessors, digital signal processors, field programmable gate arrays or combinations of computational devices, (c) memory chips of any kind, including flash and all other types of semiconductor memories, magnetic memories (including disk drives), ferroelectric memories or memories made of any other materials, or (d) application specific integrated circuits of any type, such as radio receivers, transmitters or transceivers. Components ancillary to and supporting of the electronics and their functions, such as, but not limited to, (a) batteries or other energy storage devices, (b) energy sources such as photovoltaic devices, (c) light emitters and detectors, (d) antennas of all types (including ceramic chip-scale antennas and antennas made of embedded wires or foils or conductors applied to laminates of the panels), or (e) acoustic pickups or emitters, are included in the invention. The electronics for the panels need not be monolithic units, but can consist of separated components, modules or systems that are connected by any means to pass information or energy from one part of the electronics to another part. Any means of connection, including electrical conductors, optical conductors and transmission of radiant or acoustic energy through the panel material, are included in the invention. Input devices, such as devices sensitive to touch by humans or other objects, of any type and output devices, such as any flat panel displays (including clocks) are included in embodiments of the invention.

All types and frequencies of carriers and all protocols for communication of information through solids, liquids and gasses may be incorporated in embodiments of the invention. Examples include, but are not limited to all protocols for satellite communications, cell phones, Wi-Fi and related protocols, BlueTooth, and ZigBee.

Any of the panels can have embedded into them in any fashion anyone or more of the possible electronics. All combinations of panels and electronics are contemplated. The electronics can be embedded in the panels in any manner, by any means and at any time during the production of the panels. The electronics can be made separately and then embedded into the panels, or they can be produced as part of the process of manufacturing the panels. The embedding of the electronics can be partial or full. That is, embodiments of the invention include cases where the electronics are not entirely within the panel, but recessed into the panel to some degree and in some manner. Cases where the electronics span any fraction or the entire thickness of a panel are included in the invention. The materials and means for affixing the electronics to the panels can be of any type, including adhesives and mechanical fasteners.

Loading of energy and information into the electronics can be done prior to embedding, after embedding and before use or during the useful lifetime of the panels. Loading of either energy or information can be done once or multiple times, depending on the characteristics and uses of the panels. The panels can be used in any orientation and configuration, in combination with any other materials, structures and devices, including electronics, optics and acoustics exterior to the panels. They can be used vertically and incorporated into walls of any structure. The panels can be used as windows for light or any other radiant energy. They can be installed horizontally in the floor or ceiling, or other parts, of a structure.

Example Types of Uses.

The table below describes potential uses of the invention; it is not inclusive of all potential uses.

| Type of use | Description of how invention can be used |
| --- | --- |
| Transportation Security Devices | Security portals; transmission of security signals; self-contained security packages |
| Entertainment | Wireless communication from TV—satcom; in-home wireless connectivity; wireless transmission to scoreboard; embedded in games, TV and other displays, speakers for home and other sound systems |
| Toys | Multi-function wireless games; tracking of motion toys; security of expensive outdoor toys—bicycles, cars, skateboards |
| Decorative Applications | Wireless control of wall displays, decorative features; window and security controls: panels that change colors and apparent textures |
| Home Wireless Device Control | Combination home security/home appliance controls (wireless); home environment control; alarm detection/reporting |
| Automotive applications | Radio/TV signal transmission; security, tracking, alarming; auto operational function detection and reporting |
| Trucking Applications | Same as automotive applications, plus cargo monitoring |
| Railroad Applications | Same as trucking applications |
| Maritime Applications | Safety and security detection, reporting; boat maintenance reporting functions; remote control of environment |
| Aircraft Applications | Safety, monitoring all contents of a plane (including people), providing information of any type by any means |
| Home Security | Wireless security, detection of alarms and reporting; remote control of facilities, functions |
| Monitoring Devices | Use to detect inter-modal container intrusions, changes, and provide protection; facility monitoring, control |
| Photographic usage | Dark room monitoring, control; light detection, alerting |
| Store & Other security | Concealed system for theft detection, surveillance |
| Medical | Monitoring treatment centers; monitoring transport of drugs, pharmaceuticals |
| Environmental | Monitoring sensitive rooms, areas; detection of changes in clean facilities; providing data on conditions outside of a structure incorporating electronic panels. |
| Reading Electronic ID Devices | Monitoring the presence of and reading identification tags in an area by RF or acoustic means |
| Wireless Sensors | Monitoring the presence of and reading identification tags in an area by RF or acoustic mean |
| People and Animals | Monitoring the location and activities of adults, children and pets within and nearby homes or other locations |
| Homes, Offices, Stores and Factories | Obtaining and presenting information within buildings for any purpose |
| Indoor Location Services | Relaying outdoor signals for determination of locations; providing location information by any technology |
| Military Uses | providing any of the civil functionalities to the military for any reason. |
| Miscellaneous | Panels to acquire and present information and provide controls in any locations, such as an airport, for any reason. |
| Windows | For any type of energy in any of the above applications |

FIG. 1 is a perspective view illustrating an embodiment of the invention. The displayed container wall may include a polymer-based composite with embedded electronics, sensors, and communications. Filament wound plastics are one type of polymer-based composite that may be implemented.

In embodiments of the invention, plastics may be used to provide a window approximately one-meter square in a steel box, a twenty-foot container. In other embodiments, the panel will be expanded to include a portion of the filament wound container, and contain embedded sensors and communication devices, including antennas and batteries. The concept is similar to today's smart cards which see daily usage by the billions for a variety of purposes, including security. The smart cards contain varying levels of complexity and electronics, depending on their purpose Like smart cards, the panel concept involves electronics embedded in plastics. The panel can be viewed as a larger and more structurally sound smart card with different applications. An intermodal container constructed with the panels should pass handling, usefulness, and security tests including chem/bio protection.

The "Smart" intermodal shipping containers created in embodiments of the invention will be capable of being tracked, traced, scanned for inventory, and provided with chemical, biological and other sensors to meet the Department of Defense (DoD) critical logistical requirements for providing In-Transit Visibility (ITV) in operational theaters.

An objective is to integrate off-the-shelf technology that can meet the chemical and biological agent detection requirements sought by the Army and demonstrate use of an innovative material for the container, while maintaining many of the other "smart" properties that have been researched, developed and demonstrated.

Figure 2:
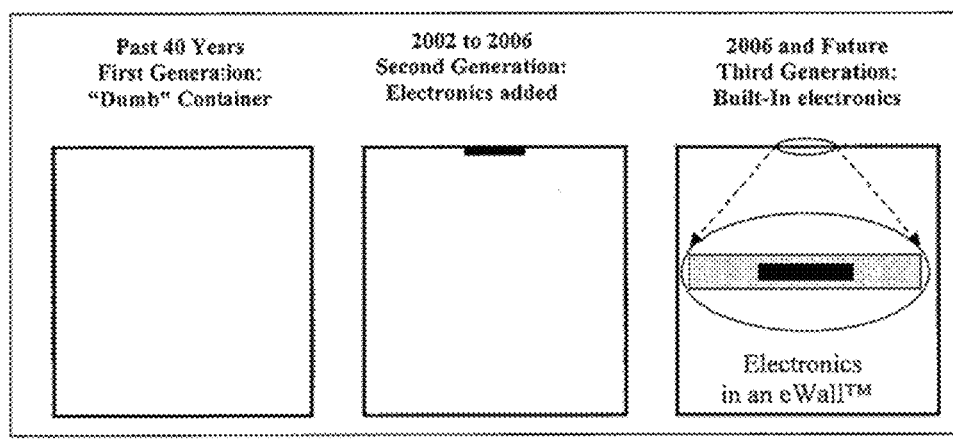
FIG. 2 shows a three-stage development process in accordance with an embodiment of the invention.

FIG. 2 schematically shows the three-stage development process that includes three generations of containers. The third generation "Smart" containers may be hybrids of metal and plastic with electronics embedded in the walls, both vertical and horizontal (as shown) This simple graphic shows the forty year first generation ISO container cross-section (left), evolved in the 2002-2006 timeframe to a second generation system with added internal electronics (sensors, batteries, communications capability), shown in the center graphic. The right-hand schematic shows the panel inserted into the container wall that has had a window cut into the box; the embedded electronics are within the panel.

Figure 3:
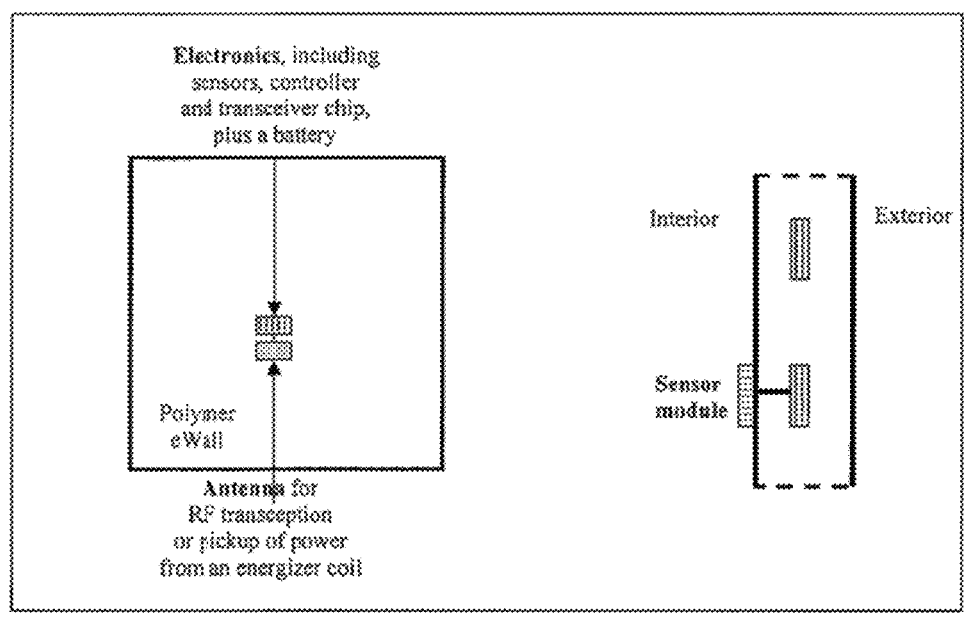
FIG. 3 is a detailed view of a panel structure in accordance with an embodiment of the invention.

FIG. 3 provides more detail regarding the structure of the third panel. The left-hand graphic shows the mounting within the panel of the functional electronics and antennas for radio frequency (RF) transception. The electronics include sensors, a controller, a transceiver chip, and batteries. The right-hand graphic is a through-the-wall cut, showing the location of components in the container, the sensors, and within the panel, the electronics and antennas. The left-panel shows the combination of electronics and antennas, which can be put in the central position, as shown, or elsewhere within the panel. The right figure shows a cross-section of the panel showing the electronics embedded within the polymer. Sensors, including imagers, can be entirely embedded or attached to the interior surface. The latter approach permits the use of different sensor modules for different purposes.

The container design is intended to be such that it will result in a lower cost manufacturing production system than exists at present and full integration into DoD total asset visibility (TAV) systems. It will meet DoD-specified chemical and biological (CB) sensing and alerting requirements. In addition, the capabilities of the proposed electronic panel system enhance the overall capability of the Army's "smart" container system.

In embodiments of the invention, a "Smart" ISO container design meets DoD operational and functional requirements for a fieldable system. Requirements include not only ITV/ATV operability and CB detection, but the analysis of the functional objectives of lowered cost (a cost less than ISO steel boxes), feasibility of operation, and equivalent or improved mechanical capabilities (to be confirmed through finite element analyses) under all operational and environmental conditions. The embodiment will integrate known and existing technologies and materials. The embodiment will meet various objectives including integration into ITV/ATV systems, CB sensing and alerting, manufacturability, withstanding normal operating conditions, structural goals, and weight goals.

Integration into ITV/ATV systems—A goal is to support the Army's mission of providing timely, customer-focused global mobility through efficient, effective, and integrated transportation from origin to destination. A global track system may be integrated and embedded in the container both in its design (in the e Wall™ demonstration) and in prototype fabrication.

CB sensing and alerting—An objective is to provide CB detection for ISO intermodal containers through a program of material protection, sensing and alerting, where such defense does not currently exist. A multi-layer filament wound "skin" which with embedded electronic panel components will be investigated to replace the generally corrugated steel skin (the steel sheet metal) that forms the current box skin.

Ability to be manufactured [manufacturability—An alternative material (i.e., the electronic panel and its surrounding material to replace the steel skin) may be implemented with demonstrated manufacturability, to replace the current principally steel boxes employed in the industry. The feasibility of manufacturing and securing nominal size sheets may be demonstrated.

Withstanding normal operating conditions—The severe stresses imposed by the operating conditions a container must withstand through handling, stacking, imposed gloads, torque, compression loading, and others are addressed and handled. A high strength steel frame may be attached to the skin. The frame and the electronic panel box will be structurally designed to handle all anticipated conditions. Finite element methods (FEM) of analysis will be used to calculate the strength of the container under operating conditions.

Withstanding extremes of environmental conditions—The environment to which a sea container is exposed is severe, ranging from temperature extremes to severely corrosive sea air, heavy icing conditions, and pounding rain. The container must withstand this environment. Modern materials may be implemented, capable of meeting all anticipated environmental conditions.

Structural goals—Embodiments of the invention will equal or exceed the strength of a steel box. A modern steel frame and composite sheeting materials may be sized to provide the necessary structural response. Finite element analyses (FEA) can be conducted to study the box strength.

Weight goals—A fifty percent reduction in weight of the overall box versus steel can be provided to meet a highly desirable commercial goal. Light weight high strength plastic composites may be implemented. Light weight and ultra high strength composites tend to be very expensive, perhaps prohibitively, so an optimum strength versus cost in tradeoff analyses may be required for each application.

The ISO intermodal shipping container that has been developed over the last 40 years is a basic steel "dumb" box. The labor-intensive manufacturing fabrication method required to fabricate the box has been unchanged in virtually four decades; manufacturing has been outsourced to foreign countries (principally in Asia) to obtain lower prices. New and advanced manufacturing processes using polymer-based composite material, material co-mingling (integration), and dynamic structural design using finite element analysis can be used to investigate the manufacturing process to shift from its current labor intensive single unit fabrication to mass production. with possibly a 50% reduction (estimated) in overall weight.

A filament wound polymer may be used as a principal polymer-based material, integrated with either the existing steel skeleton or an augmented (to obtain the necessary compressive strength) skeleton for the basic container structural material, incorporating sensors that can detect unauthorized entry and chemical agents, biological agents, explosives, and possibly illegal drugs. The system may be designed to consider future fiber optic sensing systems. Additionally, the container may be fabricated integrating a proprietary security and communication system, such as SPC's GlobalTrack™ container security system.

Current steel containers are not hardened or integrated in any manner for survivability to a chemical or biological attack. The contents of the all-steel containers may be contaminated in a CB attack. The next generation of ISO "Smart" intermodal shipping containers must be CB hardened, which starts with CB detection, and RFID (Radio Frequency Identification Device) capable.

Active RFID interrogation is rapidly becoming a requirement. Within an enclosed steel container, RFID interrogation is not easily performed because of the impossibility of radio wave propagation through steel walls Our plastic walls, being transparent to RF waves and yet maintaining structural integrity, will allow penetration of the RFID signals. Disposable low-cost RFID passive tags can be applied at the lowest levels (individual item, case, pallet, etc.) to meet minimum tagging requirements for data acquisition. The features will allow DoD to reach established goals and objectives through providing enhanced CB protection, total asset visibility, improved life cycle costs, accurate financial audits of inventory, and logistical tracking of container movements.

To summarize, the features may include: (a) A GPS transponder provided for real time tracking capability; this is included with the GlobalTrak System today. (b) Xray transparency; X-rays will easily pass though a non-steel container e Wall™, thereby increasing homeland security. (c) The "Smart" container incorporating SPC's GlobalTrak™ system will allow for a single source logistical system capable of wireless encrypted data transmission to handheld as well as fixed data download stations; centralized data retrieval will be possible. (d) Commercial applications for this technology appear to be extensive and include commercial merchant shipping, dry and refrigerated cargos (possibly using a foamed polymer shell). (e) The "Smart" container, particularly as it incorporates the GlobalTrak™ System as its core, will meet Department of Homeland Security directives regarding container security.

Since containers were first manufactured in the 1960's, many materials and processes have been used. Large polymer containers have been investigated, and are currently fabricated and used for DoD purposes such as large missile and rocket components. Information concerning these uses and materials will be compiled. Panel development may be assessed to optimize material usage. The state of high-strength polymer development and integration of the steel skeleton and polymer skin (that is, combination of the filament wound plastic and steel structural members) may be implemented.

Figure 4:
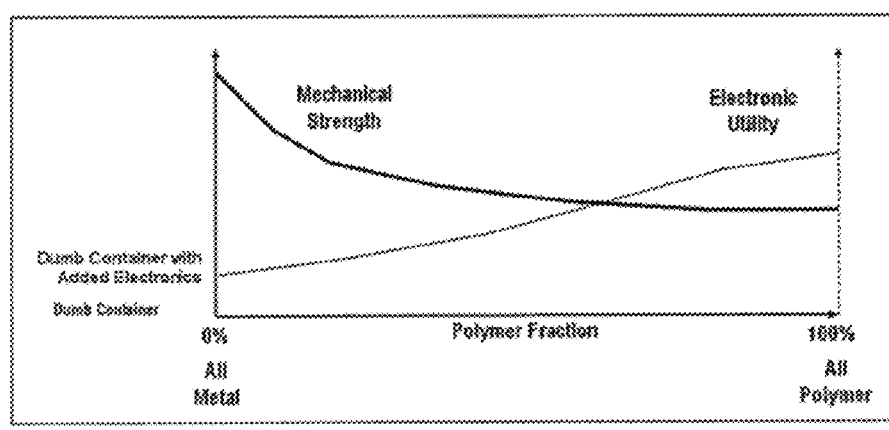
FIG. 4 is a schematic indication of the variation of the mechanical strength and the electronic utility of a container in accordance with an embodiment of the invention.

FIG. 4 is a schematic indication of the variation of the mechanical strength and the electronic utility of a container shown as a function of the fraction of plastic making up the structure of the container. As polymer replaces metal, the strength will decrease, but the ability to build electronics into the structure of the container increases. Thresholds for strength are known. The shapes of the variations in mechanical strength and electronic utility are merely suggestive.

FIG. 4 shows the diminished mechanical strength as a function of increased fraction of plastic, as well as increased electronic utility. The eWall™ demonstration using the meter-square window will be located on this graphic at approximately the 2% plastic fraction point.

Figure 5:
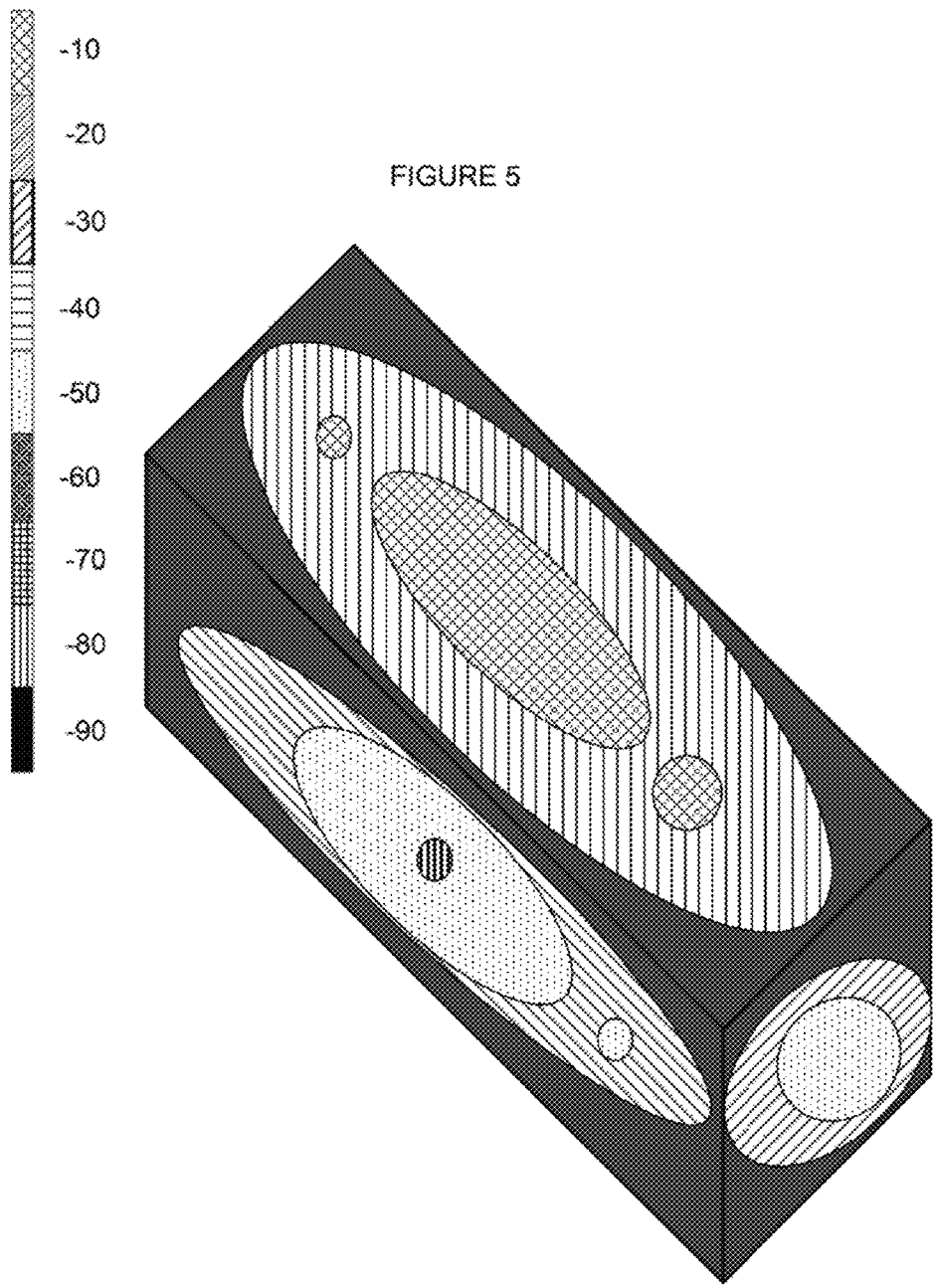
FIG. 5 is a finite element analysis of stresses in container-like box in accordance with an embodiment of the invention.

FIG. 5 shows finite element analysis of stresses in container-like box Parametric analysis may include finite element analyses (FEA) of portions of the configuration to assist in estimating the mechanical strength of various designs. FIG. 5 is an example of the finite element analysis of a container taken from http://www.clfrl.ac.uk/Facilities/AstraWeb/AstraGeminiIntChamb.htm. It shows a configuration of a chamber similar to a container undergoing finite element analysis.

Electronic panel windows may include compound sheets approximately 1 meter by 1 meter and testing for RFID transmission into the container. The window will be mounted on the side of the container as shown earlier. The RFID tests will be performed as shown in FIG. 6.

Figure 6:
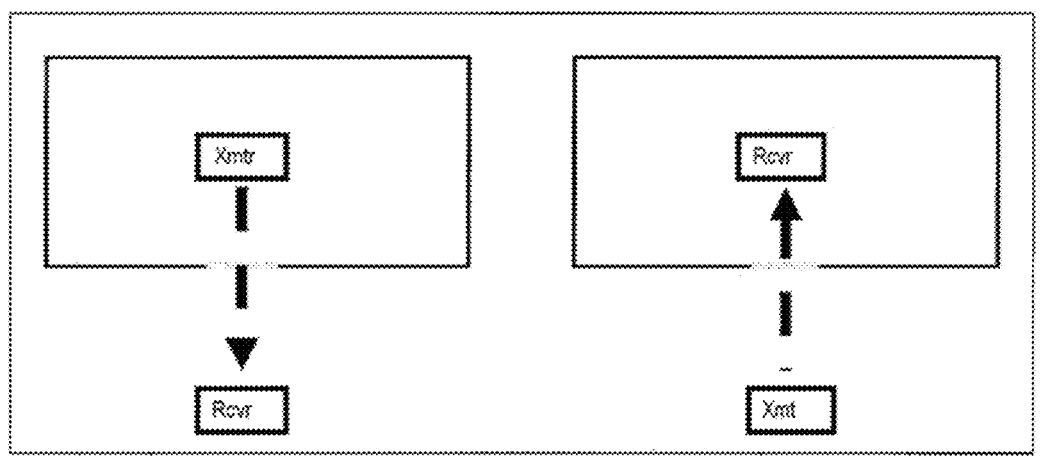
FIG. 6 illustrates RFID testing in accordance with an embodiment of the invention.

FIG. 6 illustrates plan views of the demonstration container showing the location of the RF transmitter (Xmtr) and receiver (Rcvr) for demonstrating the bidirectional transmissibility of the eWall™ to common RF frequencies for RFID and wireless sensors. The Xmtr will be a frequency generator with an antenna, and the Rcvr antenna feeding an RF spectrum analyzer.

In embodiments of the invention, new and potential replacement material and fabrication technology may be implemented. While existing non-conventional materials are used for containers, the employment of such materials, e.g., filament wound plastics and proven fabrication processes, offers exciting opportunities when coupled with Global-Track™ system implementation. For example, the Global-Trak™ device and its communication network can be fabricated to be integral with the container, and certain elements of the system can be molded into the container, making it a totally secure and integrated 'smart container' as has been long sought by the USG and industry.

As the adoption of "smart cards" has revolutionized personal security in terms of efficiency and additional security, so can the eWall™ program and its enhancements to container technology. The container contents can be scanned very efficiently, and 100% of the containers can be rapidly screened. This is a considerable improvement from the screening possible today. the possibility of providing an evolutionary new method for container inspection, and beyond that, it can offer the ground step of application of innovative materials in the modern container market.

The smart container can help overcome the fears of many regarding security. Costs can be reduced, transit time can be reduced, and labor-intensive human inspections can be basically eliminated. Beyond serving its principal role as an intermodal shipping container, there are other roles suggested. These include providing emergency housing for FEMA emergency operations, providing refrigerated container use, and providing a means of carrying potable water. While such uses have been considered, they have not been found overly attractive. the use of a more fully polymerized container for such purposes may be advisable.

While particular embodiments of the invention have been illustrated and described in detail herein, it should be understood that various changes and modifications might be made to the invention without departing from the scope and intent of the invention.

From the foregoing it will be seen that this invention is one well adapted to attain all the ends and objects set forth above, together with other advantages, which are obvious and inherent to the system and method. It will be understood that certain features and sub-combinations are of utility and may be employed without reference to other features and sub-combinations. This is contemplated and within the scope of the appended claims.

What is claimed is:

1. A wall system configured to provide monitoring and structural support for a cargo container wherein the container is comprised of an interior area for holding goods and a plurality of wall components for enclosing the interior area, the wall system comprising:

at least one wall component having a housing enclosed within the body of the wall component for enclosing embedded electronics outside of the interior area, wherein the housing is comprised of six sections including an outer wall, an inner wall, a roof section, a floor section, a front wall and a rear wall, further wherein at least one section of the wall component provides structural support for the body of the cargo container;

wherein at least one section of the wall component is comprised of an outer layer, wherein the outer later is comprised of at least one material which permits the transmission of signals through the wall of the container; and an electronics panel designed to support a suite of electronic components, wherein the suite of electronic components includes one or more components for monitoring the interior area of the container.

2. The wall system of claim 1, wherein the electronics panel is configured to support:

at least one sensor element;

a communications element;

a processing element; and a global positioning or GPS element.

3. The wall system of claim 1, wherein the wall system performs at least one of the following functions:
   structural support;
   barriers to matter, energy and biological entities;
   the exclusion or inclusion of humans in nearby spaces;
   sound and impact absorbers; or
   windows for electromagnetic radiation, notably visible light and radio frequency waves.

4. The wall system of claim 1, wherein at least one section of the wall component is comprised of dielectric materials such that they will transmit or receive various forms of radiant energy.

5. The wall system of claim 1, wherein at least one section of the wall component is comprised of selective filters which may be transmissive to some forms of radio frequency energy but opaque to others.

6. The wall system of claim 1, wherein the electronics within the electronics components include at least one electronic device selected from the group of electronic devices containing: conductors, semiconductors, resistors, glasses, polymers, liquid crystals, either active or passive components, or both, any combination of analog or digital devices, a battery or power source, antenna devices, devices for radio frequency transmission or reception, or sensor devices.

7. The wall system of claim 2, wherein the communications element comprises a wireless communications device comprised of a transmitter element, a complementary receiver element, and an antenna element.

8. The wall system of claim 2, wherein the processing element controls the system, collects data from the sensors, processes sensor data, and sends data to the communications element.

9. The wall system of claim 2, wherein the sensor element comprises one or more sensors, collects data from the sensors, processes sensor data, and sends data to the wireless communications device.

10. The wall system of claim 7, wherein the communications device comprises a cellular communications device, a satellite communications device, or both.

11. The wall system of claim 2, wherein the sensing element includes at least one sensor selected from the group of sensors containing: temperature sensor, visible light sensor, acoustic sensor, vibration sensor, motion sensor, microbolometer, radiation sensor, hazardous chemical sensor, explosives sensor, proximity sensor, infrared sensor, door switch sensor, and smoke detector.

* * * * *